(12) United States Patent
Andrew et al.

(10) Patent No.: US 9,290,604 B2
(45) Date of Patent: Mar. 22, 2016

(54) NPE-FREE EMULSIFIERS FOR WATER-BLOWN POLYURETHANE SPRAY FOAM

(75) Inventors: Gary Dale Andrew, Walnutport, PA (US); Jean Louise Vincent, Bethlehem, PA (US); Timothy J. Miller, Northampton, PA (US); Goran Zarkov, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 538 days.

(21) Appl. No.: 13/206,545

(22) Filed: Aug. 10, 2011

(65) Prior Publication Data

US 2012/0202903 A1    Aug. 9, 2012

Related U.S. Application Data

(60) Provisional application No. 61/373,419, filed on Aug. 13, 2010.

(51) Int. Cl.
| | |
|---|---|
| *C08J 9/00* | (2006.01) |
| *C08G 18/06* | (2006.01) |
| *C08G 18/28* | (2006.01) |

(Continued)

(52) U.S. Cl.
CPC ............. *C08G 18/283* (2013.01); *C08G 18/10* (2013.01); *C08G 18/12* (2013.01); *C08G 18/2835* (2013.01); *C08G 2101/00* (2013.01); *C08G 2101/005* (2013.01)

(58) Field of Classification Search
CPC ....................................................... C08G 18/14

USPC ................................................. 521/109.1, 116
See application file for complete search history.

(56) References Cited

U.S. PATENT DOCUMENTS 3,929,678 A * 12/1975 Laughlin et al. ............. 510/349
5,451,615 A *  9/1995 Birch .......................... 521/132

(Continued)

FOREIGN PATENT DOCUMENTS

| GB | 886636  | 1/1962 |
|---|---|---|
| GB | 1001946 | 8/1965 |

(Continued)

OTHER PUBLICATIONS

Machine Translation of JP 2004137494 A.*

(Continued)

*Primary Examiner* — Mike M Dollinger
(74) *Attorney, Agent, or Firm* — Michael K. Boyer

(57) ABSTRACT

Alkylethoxylate alcohols or mixtures of alkyl alcohol ethoxylate with an average HLB value between 10 and 15 as compatibilizers for water blown polyurethane foam formulations that are substantially free of nonylphenol ethoxylates are disclosed. The HLB is defined as the mass percent of average structure of the compatibilizer that is hydrophilic, divided by 5. The compatibilizer is mixed into the B-side of the polyurethane formulation. The B-side of the spray foam formulations comprise polyol, water, amine catalyst, and the compatibilizer of the invention such that the water is present at about 2% to about 30% by weight of the B-side formulation, and the compatibilizer is present at about 1% to about 30% by weight of the B-side formulation. The B-side of the formulation may further comprise metal catalysts, flame retardants, silicone surfactants, cell openers, antioxidants, as well as other additives.

27 Claims, 4 Drawing Sheets

Structure of an NPE.

(51) Int. Cl.
*C08G 18/10* (2006.01)
*C08G 18/12* (2006.01)
*C08G 101/00* (2006.01)

(56) References Cited

U.S. PATENT DOCUMENTS

| | | | | |
|---|---|---|---|---|
| 6,753,357 | B2* | 6/2004 | Kalinowski et al. | 521/130 |
| 2005/0043423 | A1* | 2/2005 | Schmidt et al. | 521/155 |
| 2006/0052468 | A1* | 3/2006 | Janzen et al. | 521/130 |
| 2006/0175575 | A1* | 8/2006 | Kaplan | 252/182.24 |
| 2006/0223723 | A1* | 10/2006 | Provan | 508/464 |
| 2006/0234899 | A1* | 10/2006 | Nekmard et al. | 510/439 |
| 2007/0238800 | A1* | 10/2007 | Neal et al. | 521/174 |
| 2009/0124718 | A1* | 5/2009 | Lekovic et al. | 521/137 |
| 2010/0087562 | A1* | 4/2010 | Diloreto et al. | 521/170 |

FOREIGN PATENT DOCUMENTS

| | | | |
|---|---|---|---|
| GB | 1139510 | | 1/1969 |
| JP | 2004137494 | A * | 5/2004 |
| JP | 2004137494 | A2 | 5/2004 |
| WO | 98/42764 | A1 | 10/1998 |
| WO | 00/46266 | A1 | 8/2000 |
| WO | 2007/094780 | A1 | 8/2007 |
| WO | 2007/144272 | A1 | 12/2007 |

OTHER PUBLICATIONS

Akoh, C., et al.; "Lipid-Based Emulsions and Emulsifiers"; Food Lipids Chemistry Nutrition; CRC Press; p. 77.
Griffin, W.C.; "Calculation of HLB Values of Non-Ionic Surfactants";Journal of the Society of Cosmetic Chemists; 1954; vol. 5; pp. 249-235.
"Priority Substances List Assessment Report"; Canadian Environmental Protection Act; 1999.
Bakke, D.; USDA Forest Service Pacific Southwest Region (Region 5) Human and Ecological Risk Assessment of Nonylphenol Polyethoxylate-Based (NPE) Surfactants in Forest Service Herbicide Applications; 2003.
Watkins, C.; "Endocrine Disruption"; Inform; 2006; vol. 17.

* cited by examiner

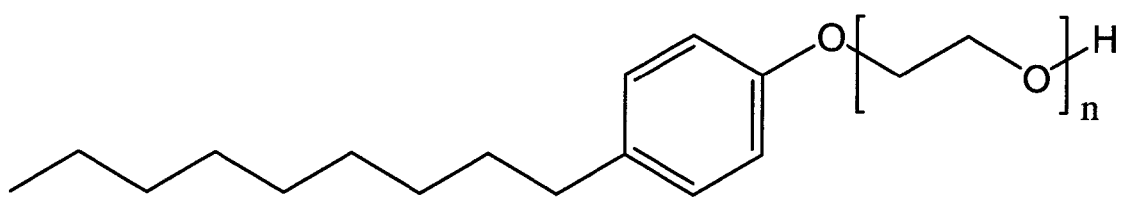
Figure 1, Structure of an NPE.
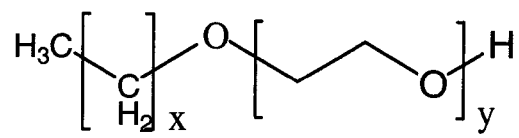
Figure 2, Examples of an Alkyl alcohol ethoxylate Phase stability measurements

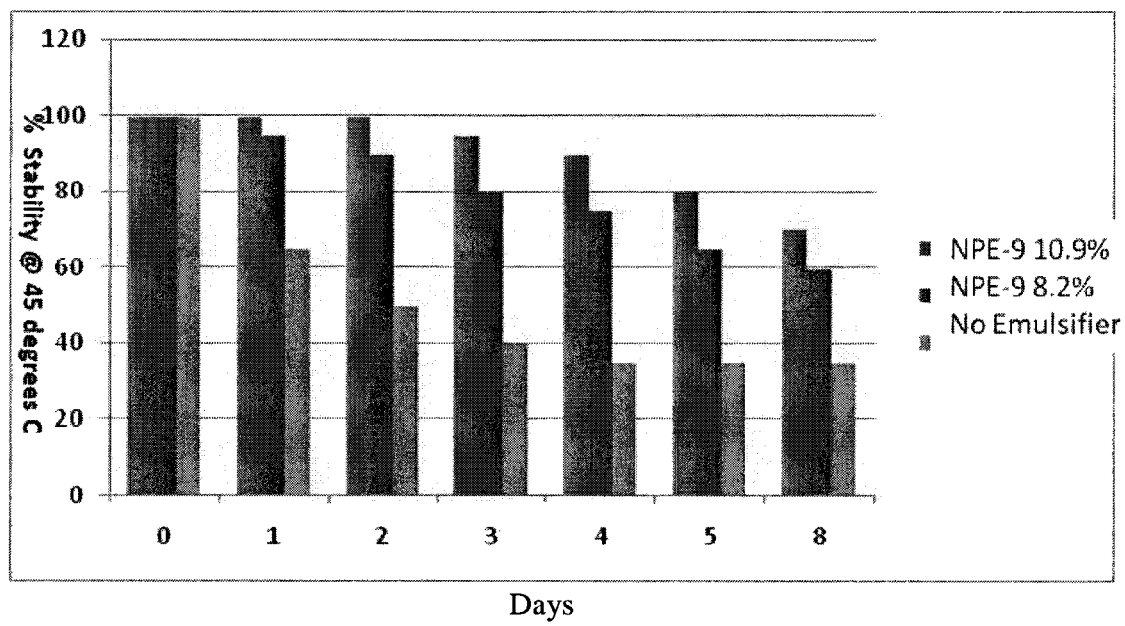
Figure 4, Percent Phase Stability of NPE-9 (comparative example)

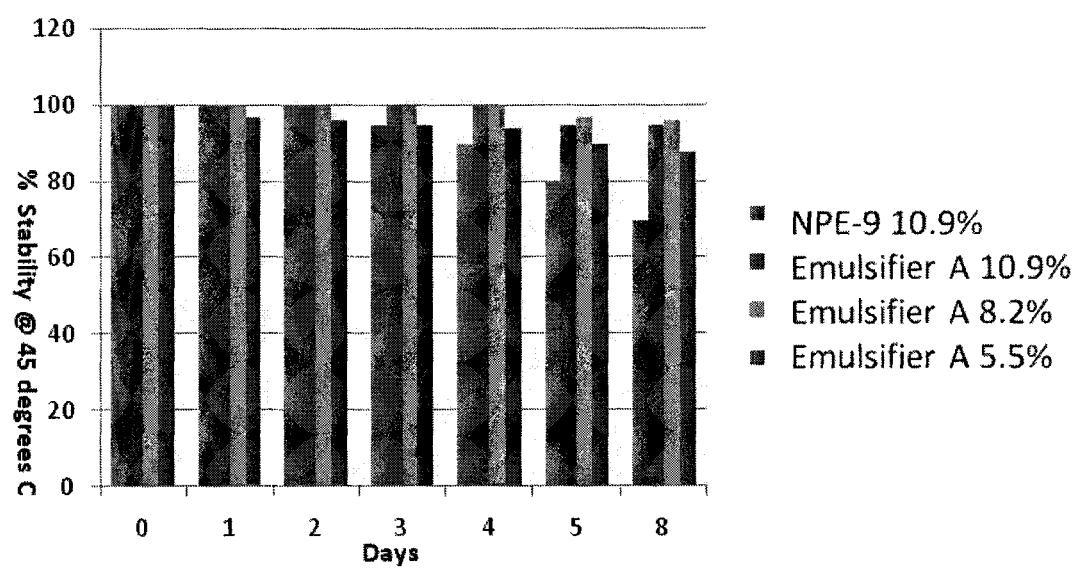
Figure 5, Percent Phase Stability of Emulsifier A (inventive example)

NPE-FREE EMULSIFIERS FOR WATER-BLOWN POLYURETHANE SPRAY FOAM

This application claims the benefit of U.S. Provisional Patent Application No. 61/373,419, filed Aug. 13, 2010. The disclosure of Application No. 61/373,419 is hereby incorporated by reference.

BACKGROUND OF THE INVENTION

The subject matter of this invention relates to water or water co-blown polyurethane foam (e.g., an air or sound barrier in interior walls and ceilings in construction applications), and foam precursors used in space-filling applications such packging foams, spray-applied sound and air barriers in interior walls, insulating spray-applied roofing foam, pour-in-place foam, and other construction applications. The present invention also provides a method for making a water or water co-blown, polyurethane (PUR) foam, especially low density spray-applied PUR foams.

In conventional polyurethane foam manufacturing methods, the isocyanate portion of a low density water-blown polyurethane formulation is referred to as the A-side, while the isocyanate-reactive portion is referred to as the B-side. In a spray-applied PUR formuation, the A-side and the B-side are stored separately, and typically combined at the point of application through a high pressure spray application equipment. The B-side typically contains water, polyol, flame retardants, antioxidants, silicone surfactants, cell openers, and other additives, all pre-mixed together. Formulations for this type of material application contain amounts of water ranging from about 2 to about 30 weight percent in the B-side. The water acts as both a chemical blowing agent by reacting with isocyanate to produce $CO_2$ gas, and a physical blowing agent by releasing as steam from the heat of the polyurethane and polyurea forming chemical reactions. This relatively high percentage of water in the formulation can lead to phase instability, in which the water is no longer completely soluble in the other components of the B-side. Phase separation can become a problem for formulators who prepare, store, and ship the B-side premix to in 55 gallon drums. Spray applicators in the field have no way to see inside the steel drum to visualize the phase separation, and mixing of the material in the field can be very difficult and it is always not known if complete mixing has been achieved. Phase separation of the components can lead to differences in reactivity, cell structure, physical properties as well as the consistency of the sprayed PUR foam.

To address these problems, emulsifiers can be added to the formulation. An emulsion is generally defined as a stable mixture of two or more immiscible or unblendable liquids. The prior art describes emulsifiers that are in the class of chemical compounds known as nonylphenolethoxylates, or NPE's (a general structure of an NPE is shown in FIG. 1). GB 1139510, GB 1001946, and GB 886636 and WO 00/46266 are illustrative of NPE emulsifiers and describe the general methods of preparing polyurethanes, which may include the incorporation of various additives including surface-active agents such as oxyethylated fatty alkyl phenols (NPE's), oxyethylated fatty alcohols (alkylethoxylated alcohols), foam stabilizing agents such as silicone polyethers, among other conventional additives and agents. The prior art does not teach how to use the surface active agents, ranges of HLB's for the surface active agents, that certain structures are more efficient in high water systems, or formulations that are free or substantially free of NPEs.

The disclosure of the previously identified patents and patent applications is hereby incorporated by reference.

In recent years, concerns have been raised that some NPE's may exhibit weak estrogen-like properties, although much weaker than naturally occurring estrogen estradiol, or may be endocrine disruptors. While there are currently no use restrictions in the United States, NP and NPE's are being evaluated by the Environmental Protection Agency under the new Chemical Action Plan (CAP) program. Therefore, there is a need in this art for spray foam formulations which are NPE-free.

BRIEF SUMMARY OF THE INVENTION

The instant invention solves problems associated with conventional foam and foam precursors by providing a foaming composition that is free or substantially free of NPEs. By "substantially free", it is meant that there is less than about 5% and, in some cases, about 0%, by mass of the emulsifier is an NPE.

The inventive composition can be employed in an inventive method that comprises contacting at least one polyisocyanate with an isocyanate-reactive mixture comprising at least one polyol, water, a catalyst, and an emulsifier with a calculated HLB value between about 10 and about 15, at an isocyanate index of about 30 through about 200, the resulting foam having a density of about 6 to about 32 Kg/m3. The isocyanate-reactive mixture is about 2 to about 30% by mass water and about 1 to about 30% by mass emulsifier, and is free or substantially free of nonylphenol ethoxylates (NPE's). The inventive emulsifier comprises at least one alkyl alcohol ethoxylate or mixture of alkyl alcohol ethoxylates.

One aspect of this invention relates to a composition comprising an isocyanate-reactive mixture comprising at least one polyol, water, at least one catalyst, and at least one alky alcohol ethoxylate emulsifier with a calculated HLB value between about 10 and about 15, at an isocyanate index of about 30 to about 200.

Another aspect of this invention relates to a method to stabilize the B-side in water or water co-blown polyurethane formulations using alkyl alcohol ethoxylates that are substantially free of NPE's. Furthermore, certain aspects of this invention have the unexpected advantage that the alkyl alcohol ethoxylates are more efficient at emulsifying the B-side components of the formulation, and lower use levels are required compared to NPE's.

A further aspect of the invention relates to a method for making a polyurethane foam, the method comprising contacting at least one isocyanate with an isocyanate-reactive mixture comprising at least one polyol, water, at least one amine catalyst, and at least one emulsifier, at an isocyanate index of 30-200, the resulting foam having a density of about 6 to about 32 Kg/m3; wherein the isocyanate-reactive mixture is about 2 to about 30% by mass water, about 1 to about 30% by mass emulsifier, and is substantially free of nonylphenol ethoxylates (NPEs), and the emulsifier comprises at least one alkyl alcohol ethoxylate and has an average calculated HLB value between about 10 to about 15.

Another aspect of the invention relates to foamable compositions, methods for making foam and polyurethane foams that are low-density and either water-blown or water co-blown. By "low-density" it is meant a foam having a density of about –6 kg/m3 to about 16 kg/m3. By "water-blown or water co-blown" it is meant a foam containing either water as the blowing agent or water in combination with an auxiliary blowing agent such as an hydrofluorocarbon, such that the total amount of water in the B-side of the formulation is from about 2 to about 30%.

BRIEF DESCRIPTION OF SEVERAL VIEWS OF THE DRAWINGS

FIG. 1 is illustrates the chemical structure of NPE.

FIG. 2 is illustrates the chemical structure of the inventive emulsifier.

FIG. 4 is a graphical representation of Percent Phase Stability of NPE-9.

FIG. 5 is a graphical representation of Percent Phase Stability of the inventive emulsifier.

DETAILED DESCRIPTION OF THE INVENTION

Figure 3:
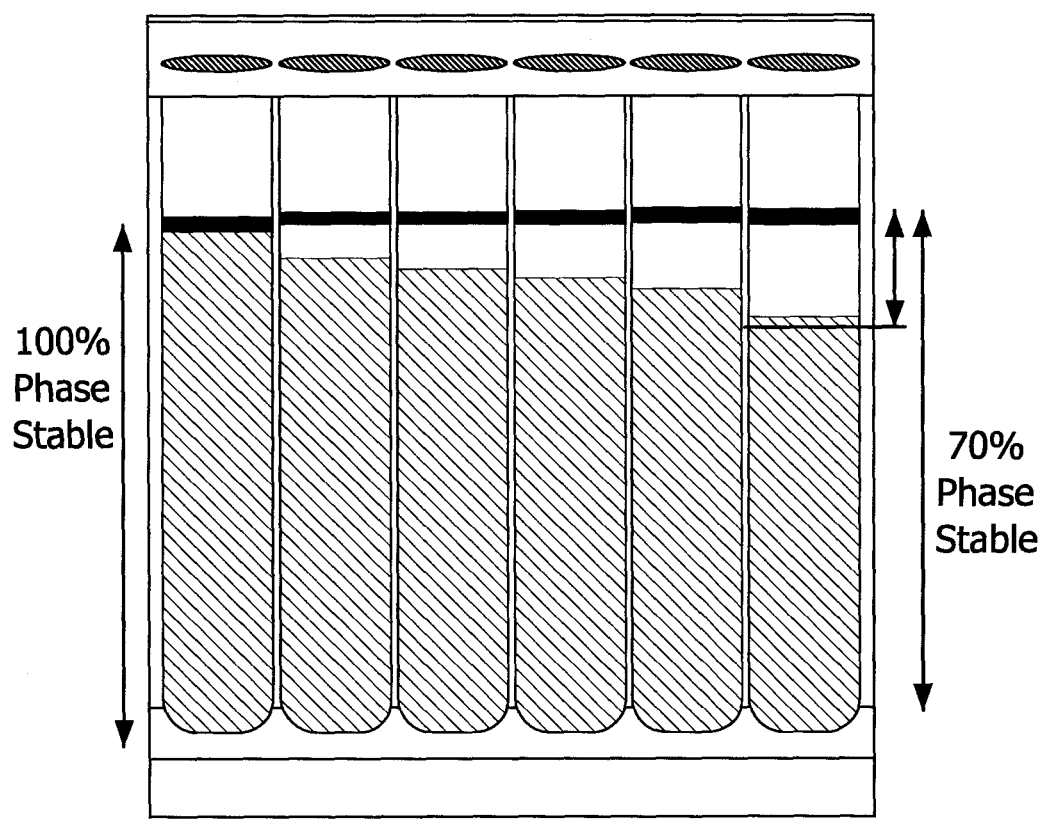
FIG. 3 is photograph illustrating phase stability measurements.

The instant invention relates broadly to foams, foam precursors and methods for making foam wherein an emulsifier that is free or substantially free of NPEs is employed. The inventive compositions and methods can produce polyurethane foam that reduces, if not eliminates problems associated with NPEs while also being capable of reducing the amount of emulsifier that is necessary to produce foam.

A method of the invention comprises contacting at least one polyisocyanate (A-side) with an isocyanate-reactive (B-side) mixture comprising at least one polyol, water, a catalyst, and an emulsifier with a calculated HLB value between about 10 and about 15, at an isocyanate index of about 30 to about 200, the resulting foam having a density of about 6 to about 32 Kg/m3. The B-side is about 2 to about 30% by mass water and about 1 to about 30% by mass emulsifier, and is substantially free of nonylphenol ethoxylates (NPE's). The emulsifier comprises at least one alkyl alcohol ethoxylate or mixture of alkyl alcohol ethoxylates.

For purposes of the present invention, Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms. PUR foam products which are produced with an Isocyanate Index from about 30 to about 200 are within the scope of this invention. The volume ratio of the isocyanate A-Side to the isocyanate reactive B-side typically ranges from about 0.5/1 to 1.5/1 by volume, and is most typically 1/1 by volume.

While any suitable isocyanate can be used, examples of isocyanates suitable for use in this invention comprise at least one member selected from the group consisting of hexamethylene diisocyanate, isophorone diisocyanate, phenylene diisocyante, toluene diisocyanate (TDI), diphenyl methane diisocyanate isomers (MDI), hydrated MDI and 1,5-naphthalene diisocyanate. For example, 2,4-TDI, 2,6-TDI, and mixtures thereof, can be readily employed in the present invention. Other suitable mixtures of diisocyanates include, but are not limited to, those known in the art as crude MDI, or PAPI, which contain 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's. The amount of isocyanate typically ranges from about 40% to about 60% by weight of the total foam formulation.

While any suitable polyol can be employed, examples of polyols suitable for use in this invention comprise at least one member selected from the group consisting of polyalkylene ether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols, These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols. Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide. In another aspect of the present invention, a single high molecular weight polyether polyol, or a mixture of high molecular weight polyether polyols, such as mixtures of different multifunctional materials and/or different molecular weight or different chemical composition materials can be used. In yet another aspect of the present invention, polyester polyols can be used, including those produced when a dicarboxylic acid is reacted with an excess of a diol. Non-limiting examples include adipic acid or phthalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention. Other useful polyols in the present invention include those produced from natural oils, such as soy, palm or canola, and those from sugars, sucrose, or biomass. The amount of polyol typically ranges from about 10% to about 60% by weight of the total foam formulation.

While any suitable catalysts can be employed in the instant invention, examples of catalysts suitable for use in this invention comprise at least one member selected from the group consisting of metal catalysts, such as tpotassium octoate, stannous octoate, dibutyltindilaurate, bismuthneodecanoate, and amine compounds, such as triethylenediamine (TEDA), N-methylimidazole, 1,2-dimethyl-imidazole, N-methylmorpholine, N-ethylmorpholine, triethylamine, N,N'-dimethylpiperazine, 1,3,5-tris(dimethylaminopropyl)hexahydrotriazine, 2,4,6-tris(dimethylamino-methyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylamino-cyclohexylamine, pentamethyldipropylenetriamine, triethanolamine, dimethylethanolamine, bis(dimethylaminoethyl)ether, tris(3-dimethylamino)propylamine, 1,8-diazabicyclo[5.4.0]undecene, bis(N,N-dimethylaminopropyl)-N'-methyl amine and their acid blocked derivatives, as well as any mixture thereof. The amount of catalyst typically ranges from about The amount of catalyst typically ranges from about 0.1% to about 10% by weight of the total foam formulation.

Other additives suitable for use in this invention can comprise one or more silicone surfactant, organic surfactant, flame retardants, viscosity reducers, blowing agents, chain extenders, epoxy resins, acrylic resins, fillers, pigments, or any combination thereof. The amount of other additives typically comprises about 1% to about 40% by weight of the total foam formulation, and although additives are typically incorporated into the formulation by mixture into the isocyanate-reactive B-Side, it is understood that they could also be incorporated into the isocyanate A-Side. It is understood that other mixtures or materials that are known in the art can be included in the foam formulations and are within the scope of the present invention.

Emulsifiers

Emulsifiers usually have both a hydrophilic (water-compatible) portion and a lipophilic (oil-compatible) portion to their chemical structure. The emulsifiers often used in spray foam formulations are nonylphenol ethoxlyates, or NPE's, the general structure of which is shown in FIG. 1. In an NPE, the hydrophilic portion includes a hydroxyl-terminated ethylene oxide chain, the length of which can influence the hydrophilicty of the molecule. The NPE used in the comparative examples of this invention has 9 moles of ethylene oxide in the chain (NPE-9). The lipophilic portion of an emulsifier often contains a fatty chain. For NPE's the lipophilic portion is nonylphenol. The balance of hydrophilic and lipophilic portions of the emulsifier is commonly referred to as the HLB number (Hydrophilic-Lipophilic Balance). As shown in Equation 1, the HLB can be calculated from the weight percent of the hydrophilic portion of the emulsifier, divided by 5. The HLB number can range from about 1 to about 20, with the lower number numbers representing very lipophilic structures, and the higher numbers representing more hydrophilic structures. It should be noted that the HLB for an emulsifier is calculated from the average hydrophilic content of the total composition, and emulsifiers can be formulated products with several molecular compositions. Furthermore, as HLB is used to simply provide a ranking of the balance of hydrophobic and lipophilic portions of an emulsifier, and two very different structures could have the same calculated HLB.

$$HLB = \frac{\text{weight \% Hydrophile}}{5} \quad (1)$$

Inventive Emulsifiers

The emulsifiers of the invention are alkyl alcohol ethoxylates, of the general structures shown in FIG. 2. The lipophilic portion of the molecules consists of a fatty carbon chain, which may be linear or branched, and contains between 5 and 30 carbons. The lipophilic portion may contain either petroleum-derived carbon or renewable carbon derived from a natural oil source such as soy, palm, corn, or other renewable source such as biomass. The hydrophilic portion of the molecule is substantially ethylene oxide, containing between 1 and 40 ethylene oxide repeat units. The ethylene oxide portion of the molecule is terminated in a hydroxyl group. Although the hydrophilic portion of the molecule is substantially ethylene oxide, the molecule may also comprise minimal amounts of propylene oxide or butylene oxide to lower the overall melting point. The amount of propylene oxide or butylene oxide is not more than about 10% by mass of the overall average molecular weight of the emulsifier.

The emulsifier of the invention has a calculated HLB value between about 10 and about 15, and may comprise one or more alkyl alcohol ethoxylate structure. Typically, the average calculated HLB of the emulsifier is between about 10 and about 15, and preferably, between about 11 and about 14. In one embodiment of the invention, the emulsifier comprises one or more alkyl alcohol ethoxylate structures with a calculated HLB of less than about 10, and one or more alkylethoxylate alcohol structures with a calculated HLB of greater than about 10, such that the weighted average HLB of the mixture is between about 11 and about 14. In another embodiment of the invention, the emulsifier comprises two or more alkyl alcohol ethoxylates such that there is a bimodal distribution of HLB values, with the overall average HLB being between about 11 and 14.

The emulsifier composition is substantially free of NPE's. By substantially free, it is meant that there is less than about 5% by mass of the emulsifier is an NPE.

The emulsifier of the invention is incorporated into the B-side of the polyurethane foam formulation at 1-30% by mass of the B-side. Preferably, the emulsifier is incorporated at an amout of about 5 to about 15% by mass of the B-side-. The emulsifier of the invention may be pre-mixed with about 5 to about 50% water before incorporation into the B-side in order to suppress the melting point of the emulsifier to be delivered as a liquid at room temperature.

Certain aspects of the invention are illustrated by the following Examples which do not limit the scope of the claims appended hereto.

EXAMPLES

The formulation utilized for all Examples illustrated herein is shown in Table 1. The polyol is a common polyether triol representative of that used in the industry for low density open-celled water-blown spray foam. The flame retardant was the phosphorous based TCPP, and the surfactant is a silicone polyether copolymer. The catalyst is a balanced amine catalyst, and remains consistent throughout the examples. The comparative emulsifier used in this study is a nonylphenol ethoxylate (NPE) with an average of 9 moles of ethylene oxide (herein referred to as NPE9). The emulsifier A is an alkyl alcohol ethoxylate of the structure type in FIG. 2 with a calculated HLB of 13.1. The emulsifier B is alkyl alcohol ethoxylate of the structure type in FIG. 2 with >50% of its mass derived from a renewable carbon source, and has an HLB of 12.4.

TABLE 1

Formulations Used in the Study

| Chemicals | Parts |
| --- | --- |
| Polyether Polyol (Triol) | 31 |
| Flame Retardant | 24 |
| Emulsifier | Varied |
| Surfactant | 1.05 |
| Amine Catalyst | 7.5 |
| Water | 18 |
| Isocyanate | MDI prepolymer |

Sprayfoam Application

A B-side pre-mix was prepared by blending the polyol, flame retardant, emulsifier, surfactant, catalyst and water together in a five-gallon bucket. Approximately five gallons each of the premix and the isocyanate were placed in the machine pots. The equipment used to spray is similar to that utilized in the field for residential and commercial application of polyurethane spray foam. All work presented here was done at a one-to-one by volume ratio of polyol premix to isocyanate in a standard ventilated spray booth. Cardboard inserts were used as substrates to spray in between wall studs. The equipment and processing parameters used for the machine spray work are shown in Table 2.

TABLE 2

Machine Equipment and Parameters

| Equipment | Processing Parameters |
| --- | --- |
| Gusmer VH-3000 variable ratio high pressure metering unit | Hose Temperatures 110-130° F. (43.3-54.4° C.) |
| Graco Fusion Spray Gun Air Purged | Operating Pressures 1100-1300 psi (7584-8963 kPa) |
| Mix Chamber AR4242 (01) round patter 0.042 orifice | |

The k-factor is reported in BTU·in/hr·ft$^2$·° F. (W/m·° C.) and was measured on 20×20×2.54 cm samples in a Lasercomp Fox 200 heat flow meter. Dimensional stability and density were measured by a volume station which contains three Ames pneumatic gauges for (height, length and width). Sample to gauge contact pressure is fully adjustable in order to achieve accurate measurement of very low density rigid polyurethane foam without cell/surface crushing.

The use levels of the inventive Emulsifiers A and B were 25% less than that use for comparative NPE-9 for these experiments. The reactivity, shrinkage, and physical properties of the resulting foam samples are listed in Table 3. The cream time, string gel time, and tack free times are all very similar for the three emulsifiers sprayed in this study. The set back was measured as the amount of shrinkage of the foam in the direction of the spray, using a calibrated depth gage from the surface of the foam to the cardboard substrate. The side shrinkage was measured as the amount the cardboard inserts between the studs were pulled in by foam shrinkage after the foam has cooled. For both the inventive Emulsifier A and the Emulsifier B spray runs, the set back and side shrinkage was either equal or slightly less than that observed for the NPE-9 comparative example This signifies that the foam has reached the desired amount of cell opening. The density, insulation value (k-factor) and dimensional stability are all also very good for the three emulsifiers examined in the study, indicating that there is not a negative effect of using either the inventive emulsifiers at reduced use levels.

TABLE 3

Foam Properties from Machine Runs

| Property | NPE-9 | Emulsifier A | Emulsifier B |
| --- | --- | --- | --- |
| Cream Time (seconds) | 0.5 | 0.5 | 0.5 |
| String Gel (seconds) | 2.9 | 2.7 | 2.8 |
| Tack Free (seconds) | 5.3 | 5.2 | 4.9 |
| Set Back (inches) | 0.25 | 0.06 | 0.06 |
| Side Shrinkage (inches) | 0.12 | 0.06 | 0.06 |
| Cell Structure | very fine | very fine | very fine |
| Density (lb/ft$^3$) | 0.50 | 0.47 | 0.46 |
| k-factor (BTU in/ft$^2$h° F.) | 0.280 | 0.272 | 0.273 |
| 24 hr Dimensional Stability (%) At 70° C., 95% Relative Humidity | −1.6% | −3.0% | −3.4% |

Liquid Phase Stability Studies

A series of phase stability samples of the formulation listed in Table 1 were prepared using varied levels of Comparative example NPE-9 and the inventive Emulsifier A. Some judgments can be made immediately about phase stability as a poorly emulsified system may separate in as few as 24 hours at room temperature. However, the storage stability requirements of a polyol-premix can be up to 3 to 6 months in the field. The samples in this study were placed in an oven at 45° C. and allowed to stand for up to eight days. The samples were taken out of the oven periodically and a measurement was taken to quantify the amount of separation that occurred. As shown in FIG. 3, the degree of phase separation was measured as the percent stability. Percent stability was determined by measuring the height of the bottom separated layer versus the height of the total sample.

FIG. 4 illustrates the phase separation that occurs when no emulsifier is used, with phase separation being measured after the first day, and remains constant after approximately three days. This can be compared to the phase stability obtained using NPE-9 at 10.9 parts, which remains over 90% phase stable for at least three days at 45° C. It was determined that reducing the level of NPE-9 by 25% to 8.2 parts caused higher levels of separation. When a similar stabilization study was performed using the inventive Emulsifier A, it was found that the samples remained phase stable for increased periods versus no emulsifier or NPE-9 at equivalent use levels (10.9 parts). Furthermore, significantly improved phase stability in these formulations with a 25% reduction in emulsifier use level for the Emulsifier A versus NP9 were measured. Even a 50% reduction of the standard emulsifier use level with Dabco Emulsifier A produced relatively stable samples, as shown in FIG. 5.

While the invention has been described with reference to a certain aspects or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for making a polyurethane foam, the method comprising contacting at least one isocyanate with an isocyanate-reactive mixture comprising at least one polyether polyol, at least one silicone surfactant, a blowing agent comprising water, at least one amine catalyst, and an emulsifier wherein the emulsifier comprises at least two alkyl alcohol ethoxylates having an amount of propylene oxide that is not more than about 10% by mass of the overall average molecular weight of the emulsifier and has an average HLB value between about 10 to about 15, and wherein the isocyanate-reactive mixture contains about 0% by mass of nonylphenol ethoxylates; wherein the mixture is at least 90% phase stable for at least three days at 45 C, and the foam comprises an open cell foam having a density of 6 to 16 kg/m3.

2. The method of claim 1 where the emulsifier comprises at least one alcohol ethoxylate with renewable carbon content derived from soy, palm, canola, or other natural oil seed.

3. The method of claim 1 where the mixture of alkyl alcohol ethoxylates comprises at least about 5% by mass of one of more structure with a calculated HLB below about 10.

4. The method of claim 1 where the alkyl alcohol ethoxylates consists essentially of alkyl alcohol ethoxylates having the molecular formula R—(OCH2CH2)xOH, where R is a linear, branched, saturated or partially unsaturated hydrocarbon with between 5 and 20 carbon atoms, and x is 1 to 40.

5. The method of claim 1 wherein the mixture of alkylethoxylate alcohols that has a bimodal distribution of HLBs.

6. The method of claim 1 where the emulsifier contains renewable carbon content derived from non-seed sources.

7. The method of claim 6 wherein the non-seed source comprises one or more of biomass and sucrose.

8. The method of claim 1 where the emulsifier further comprises about 5 to about 50 mass % water wherein the amount of water is sufficient to suppress the freeze point of the emulsifier such that it is a liquid at about 20 C.

9. The method of claim 1 where the catalyst comprises at least one tertiary amine.

10. The method of claim 1 further comprising spraying a contact product of the at least one isocyanate with an isocyanate-reactive mixture.

11. A method for making a polyurethane foam comprising contacting at least one isocyanate with an isocyanate-reactive mixture comprising at least one polyol, at least one blowing agent comprising about 2 to about 30 wt % water, at least one catalyst, and an emulsifier comprising at least two alky alcohol ethoxylates wherein the emulsifier has a HLB value between about 10 and about 15 and an amount of propylene oxide that is not more than about 10% by mass of the overall average molecular weight of the emulsifier and wherein the isocyanate-reactive mixture is substantially free of nonylphenol ethoxylates.

12. The composition of claim 11 wherein the composition is free of NPE.

13. The composition of claim 11 wherein the emulsifier consists essentially of emulsifiers having a chemical structure:

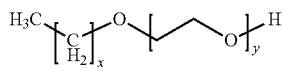

Where x is 4 to 19 and y is 1 to 20.

14. A method for making a polyurethane foam, the method comprising contacting at least one isocyanate with an isocyanate-reactive mixture comprising at least one polyol, a blowing agent comprising water, at least one catalyst, and at least one emulsifier, wherein the isocyanate-reactive mixture is at least 90% phase stable for at least three days at 45 C and comprises about 2 to about 30% by mass water, about 1 to about 30% by mass emulsifier, and is substantially free of nonylphenol ethoxylates and wherein the emulsifier comprises at least two alkyl alcohol ethoxylates and has an average calculated HLB value between about 10 to about 15 and an amount of propylene oxide that is not more than about 10% by mass of the overall average molecular weight of the emulsifier, and spraying a contact product of the at least one isocyanate and the isocyanate-reactive mixture thereby making a foam comprising an open-cell foam having a density of about 6 to about 16 Kg/m3.

15. A method of claim 1 where the isocyanate-reactive mixture further comprises a metal catalyst of tin, potassium, or bismuth.

16. The method of claim 1 where the mixture of alkyl alcohol ethoxylates comprises at least about 5% by mass of one of more structure with a calculated HLB above 15.

17. A foam made by the method of claim 14.

18. The method of claim 10 wherein the spraying comprising spraying between wall studs.

19. A method for making a water-blown polyurethane foam, the method comprising contacting at least one isocyanate with an isocyanate-reactive mixture comprising at least one polyol, a blowing agent comprising consisting water, at least one catalyst, and at least one emulsifier wherein the emulsifier comprises at least two alkyl alcohol ethoxylates and having an average HLB of about 10 to about 15 and an amount of propylene oxide that is not more than about 10% by mass of the overall average molecular weight of the emulsifier and wherein the amount of emulsifier is sufficient to provide the mixture that is at least 90% phase stable for at least three days at 45 C, and the foam comprises an open cell foam having a density of 6 to 16 kg/m3.

20. A method for making a water-blown polyurethane foam, the method comprising: i) contacting at least one isocyanate with an isocyanate-reactive mixture comprising at least one polyol, a blowing agent water, at least one catalyst, and at least one emulsifier wherein the emulsifier comprises at least two alkyl alcohol ethoxylates having an amount of propylene oxide that is not more than about 10% by mass of the overall average molecular weight of the emulsifier and an average HLB value between about 10 to about 15, and wherein the amount of emulsifier is sufficient to provide the mixture that is at least 90% phase stable for at least three days at 45 C, and ii) spraying a contact product of the at least one isocyanate and isocyanate-reactive mixture between wall studs thereby providing an open cell foam between the wall studs having a density of 6 to 16 kg/m3.

21. The method of claim 1 wherein the emulsifier contains an ethylene oxide portion containing between 1 and 40 ethylene oxide units that is terminated in a hydroxyl group.

22. The method of claim 20 wherein the emulsifier is premixed with water prior to incorporation into the mixture.

23. The method of claim 20 wherein the mixture further comprises at least one silicone polyether copolymer.

24. The method of claim 20 wherein the polyol comprises a triol.

25. A foam made by the method of claim 1.

26. A foam made by the method of claim 19.

27. A foam made by the method of claim 20.

* * * * *